Oct. 22, 1946.  R. A. CLAPP  2,409,834
TAPE MOVING MECHANISM
Filed July 19, 1944  3 Sheets-Sheet 1
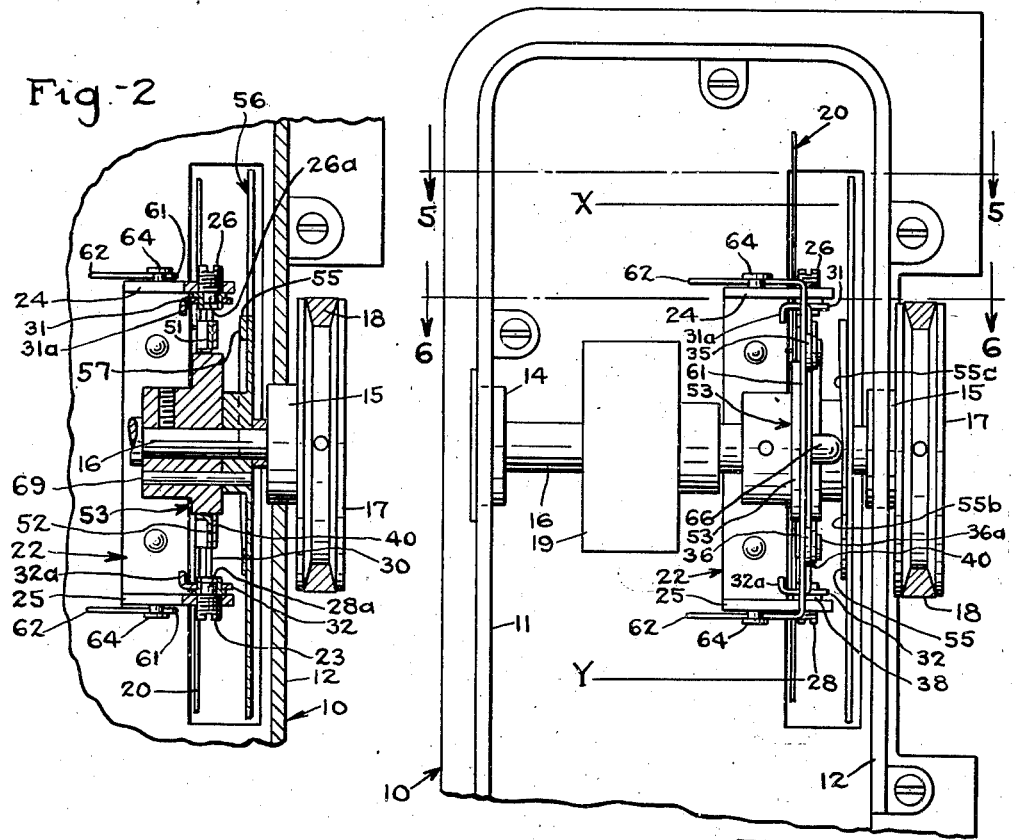
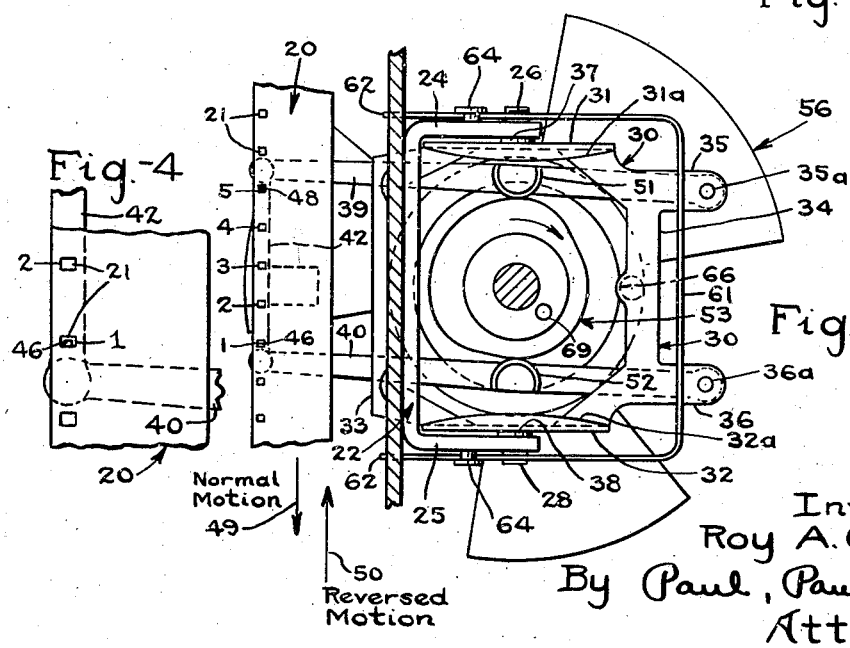
Inventor:
Roy A. Clapp.
By Paul, Paul + Moore
Attorneys.

Oct. 22, 1946.   R. A. CLAPP   2,409,834
TAPE MOVING MECHANISM
Filed July 19, 1944   3 Sheets-Sheet 2
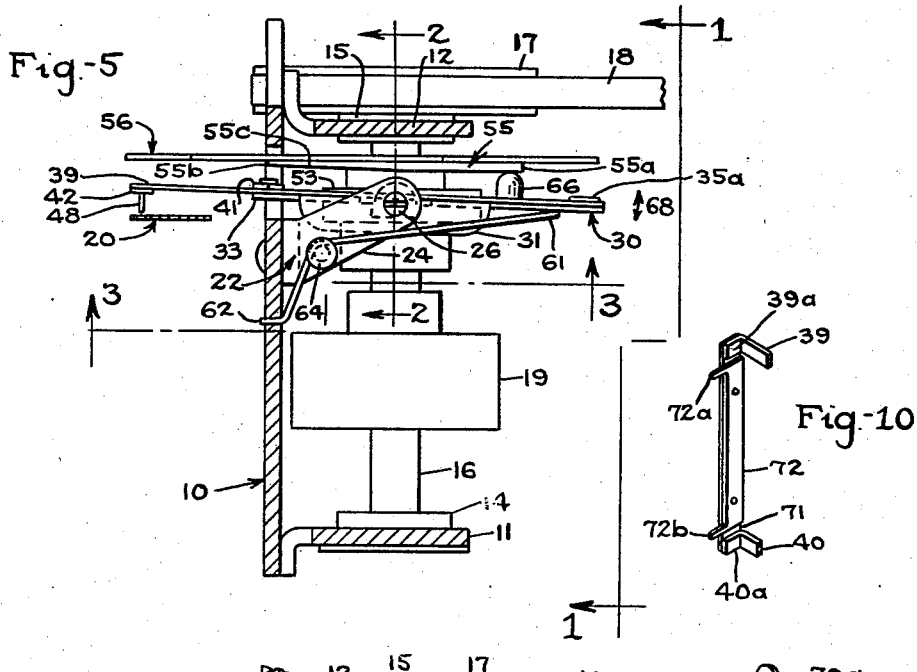
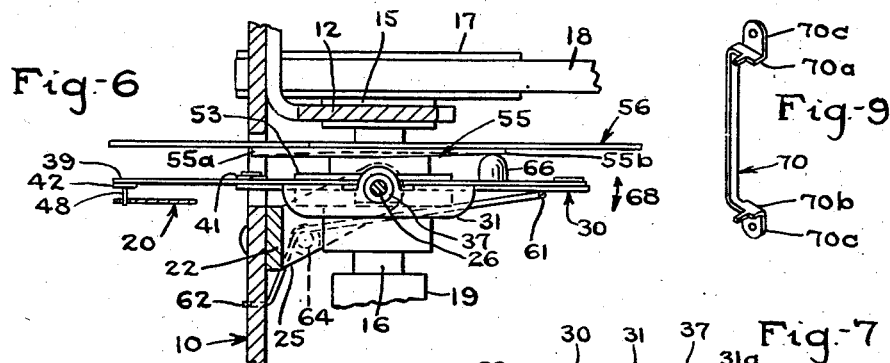
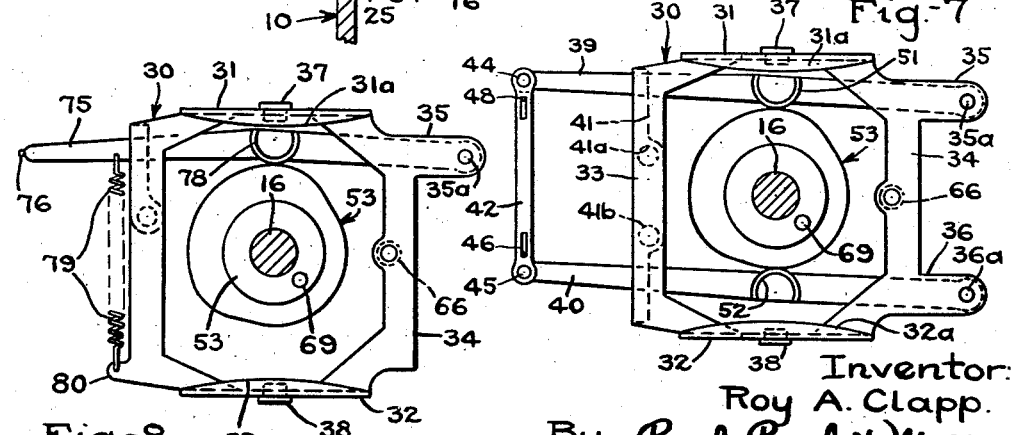
Inventor:
Roy A. Clapp.
By Paul, Paul & Moore
Attorneys

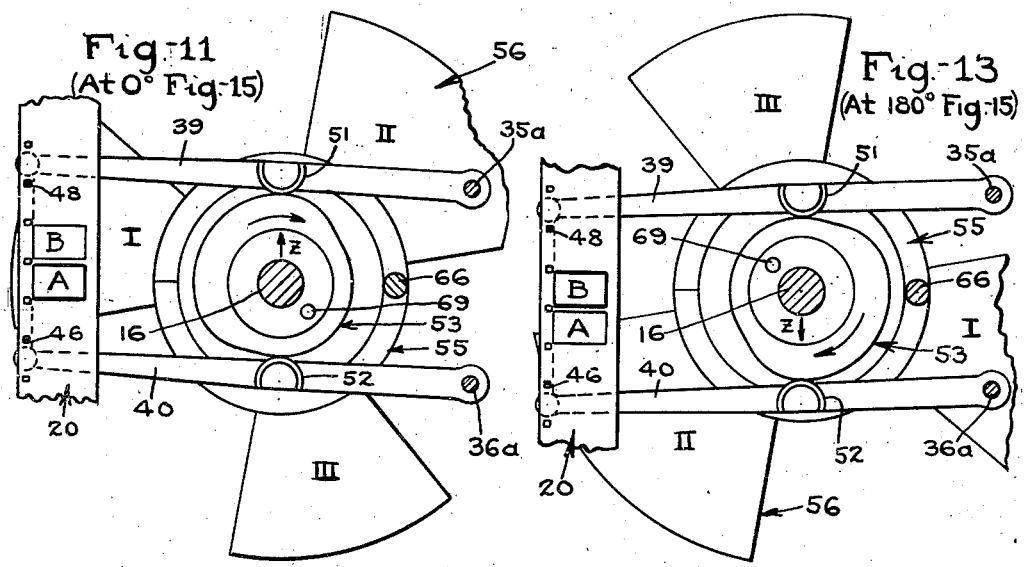
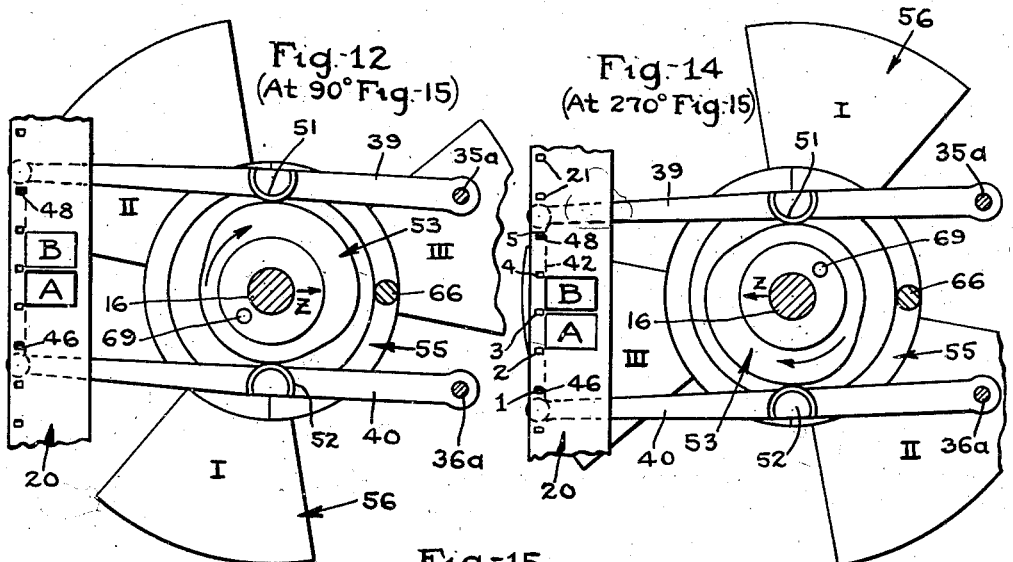
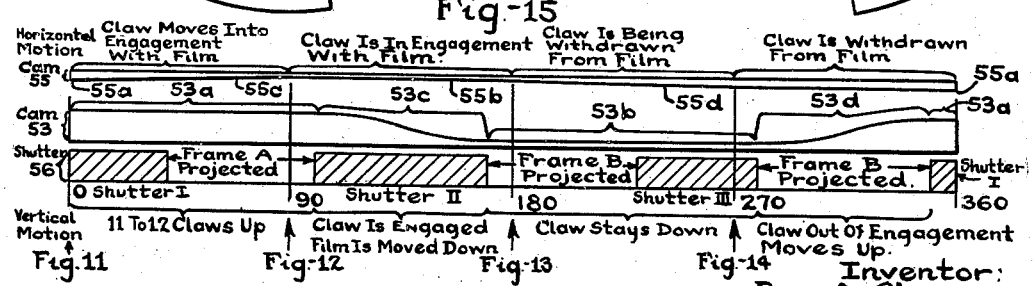

Patented Oct. 22, 1946

2,409,834

UNITED STATES PATENT OFFICE 2,409,834

TAPE MOVING MECHANISM

Roy A. Clapp, Minneapolis, Minn.

Application July 19, 1944, Serial No. 545,626

11 Claims. (Cl. 88—18.4)

This invention relates to a tape moving mechanism and more particularly to an apparatus for feeding motion picture film through a motion picture projector, the apparatus being of particular applicability with reference to smaller size 16 mm. and 8 mm. film, although not limited to these sizes of motion picture film nor to motion picture films specifically.

In the feeding of any tape or film by a periodic step-by-step motion, the requirements are that the film be rapidly progressed a uniform distance through each step and then permitted to remain at rest for a period while the indicia on the film is transcribed or projected, and incidentally while the film progressing mechanism is returned to the starting position in the cycle. The cycle thus includes a film-engaging motion, film-progressing motion, film-disengaging motion and a return of the film-progressing mechanism to the beginning point in the cycle, and as a result the film-progressing mechanisms are required to be moved very rapidly.

Mechanisms heretofore available for this purpose have not been entirely satisfactory because of excessive motion, vibration, chatter and irregular movement and acceleration of the film. It is an object of the present invention to overcome these difficulties of the prior apparatus and to provide a quiet running, rapid acting film or tape progressing mechanism capable of long periods of silent, efficient operation with minimum wear on the apparatus and the film or tape that it progresses.

It is also an object of the invention to provide a film-progressing mechanism capable of uniformly progressing torn or mutilated film and of progressing a film under uniform acceleration. It frequently happens that the perforations of motion picture film are torn and are incapable of being progressed by conventional film or tape feeding mechanisms.

It is another object of the invention to provide a film progressing mechanism wherein the ratio of the length of time available for projecting the film to the length of time consumed by film movement, is high. In mechanisms heretofore available this desirably high ratio has been achieved either by making the mechanisms large, and hence bulky, or by providing mechanisms wherein there are several false or idling strokes to each working stroke. It is an object of this invention to achieve such desirably high ratio without large size mechanisms and without utilizing any idle motions in the cycle.

Other and further objects of the invention are those inherent in the apparatus herein illustrated, described and claimed.

The invention is illustrated in the drawings in which

Figure 1 is a fragmentary side elevational view of a motion picture projector incorporating the tape-feeding mechanism of the present invention. This view is in a direction parallel to the plane of the motion picture film at the point of projection; Figure 1 is a side elevational view of a portion of the machine, looking in the direction of arrows 1—1 of Figure 5;

Figure 2 is a fragmentary side elevational view, partly in section, of a portion of the apparatus illustrated in Figure 1. The section line on which Figure 2 is taken is shown at 2—2 in Figure 5;

Figure 3 is a fragmentary side elevational view, partly in section, taken along the line 3—3 of Figure 5;

Figure 4 is an enlarged fragmentary view of a portion of the motion picture film with the tape or film feeding mechanism in engagement therewith;

Figure 5 is a fragmentary view, partly in section, taken along the line 5—5 of Figure 1;

Figure 6 is a fragmentary plan view, partly in section, taken along the line 6—6 of Figure 1;

Figure 7 is a side elevational view of a portion of the film-feeding mechanism as it appears when removed from the remainder of the apparatus;

Figure 8 is a view corresponding to that shown in Figure 7 of slightly modified form of the invention;

Figures 9 and 10 are isometric views of modified forms of tape or film-engaging claws;

Figures 11, 12, 13 and 14 are fragmentary views of the film feeding and shutter mechanism illustrating the film and film feeding mechanism, together with the shutter, where used, in four positions during a cycle of film-feeding motion;

Figure 15 is a diagrammatic view showing the timing of the horizontal and vertical motions of the claw.

Throughout the drawings corresponding numerals refer to the same parts.

Referring to Figure 1 the frame of the machine in which the tape-feeding mechanism is utilized on a motion picture projection, is illustrated generally at 10, and includes frame side walls 11 and 12 which are provided with inset bearings 14 and 15. Upon the bearings 14 and 15 there is supported an operating shaft 16 having a V-belt drive pulley 17 thereon, driven at a suitable speed by V-belt 18. A drive gear for other portions of the apparatus is illustrated at 19, the gear teeth being omitted in the illustrated embodiment for purposes of clarity. The film or tape being progressed through the machine is illustrated generally at 20, completely divorced from the tape or film supporting raceway which is of course, included in the apparatus as actually made. The raceway is not illustrated in the drawings in order that the drawings might more clearly show the tape or film and the interaction of the progressing mechanism upon it, but it will be understood that a suitable raceway is provided and that between the levels X and Y Figure 1, the tape is guided by the raceway so that it moves step-by-step in a vertical plane. It is during such movement that the pictures are projected. For purposes of such movement the tape is provided with a series of evenly spaced perforations 21, as illustrated in Figures 3 and 4. In the usual 8 mm. or 16 mm. sound motion picture film there is one perforation per film frame, and the perforation occurs at the level of dividing lines between successive frames.

Upon the machine frame 10 there is riveted a bracket generally designated 22 having outwardly spaced parallel supporting arms 24 and 25. Into each of the arms there is threaded pivot screws 26 and 28 which are aligned vertically with each other on a vertical line running through the center of the shaft 16. The pivot screws have reduced end portions 26a and 28a, Figure 2, which serve as pivotal mountings for a frame generally designated 30, Figure 7. The frame 30 is a single integral piece of metal, preferably a light metal such as aluminum and has spaced parallel upper and lower frame bars 31 and 32 which are connected together by vertical pieces 33 and 34. From the vertical piece 34 there extends side arms 35 and 36. The members 31 and 32 are flanged downwardly as illustrated at 31a and 32a and into the vertical surfaces of these members there are inset bushing members 37 and 38. Side arms 35 and 36 support pivot pins 35a and 36a which serve as pivotal mountings for parallel arms 39 and 40 which extend in a plane parallel to the plane of the frame 30. Arms 39 and 40 are held in sliding engagement with the vertical frame member 33 by means of a light spring retainer 41, Figures 6 and 7, which is riveted to frame member 33 at 41a and 41b.

The left ends of the parallel arms 39 and 40, as shown in Figure 7, are tied together by a link 42 which may be of the form shown in Figure 7, Figure 10, the forms of Figures 7 and 9 being preferred. As shown in Figure 7, the link 42 is attached to the arms 39 and 40 by means of small hardened steel pivot pins 44 and 45. The link 42 is provided with inwardly pierced claws 46 and 48 which are spaced apart so as to engage tape or film perforations more remote than adjacent perforations. Thus, as illustrated in Figure 3 it will be noted that claw 46 engages a perforation 1 whereas claw 48 engages perforation 5 in the series of which perforation 1 is the first.

In Figure 3, as in the remaining figures the tape or film 20 moves from top to bottom in the drawings or in the direction of arrow 49 and for the purpose of the film progressing motion the film is pulled downwardly by the claw 46, viz. the claw most advanced in the direction of film movement. The spacing between claws 46 and 48 is such that when claw 46 is in contact with the edge of the perforation 1 in which it is located, claw 48 is slightly spaced from the edge of the perforation 5 in which it is located. As a result the film is pulled by claw 46 rather than pushed by claw 48 under all circumstances except when there happens to be one or more perforations torn away, in which case for a small interval of time the film is pushed by the trailing claw, viz. claw 48. In the event the tape or film direction is reversed and moved upwardly, as indicated by arrow 50, claw 46 then becomes the trailing claw and claw 48 the leading claw.

Upon parallel arms 39 and 40 there are mounted a pair of cam rider blocks 51 and 52 which are arranged to ride upon opposite faces of the cam generally designated 53 on shaft 16. As shaft 16 rotates cam 53 thus imparts an oscillating vertical motion to the parallel arms 39 and 40 due to the constant engagement of cam riders 51 and 52 upon the cam 53. Upon shaft 16 there is also provided a cam generally designated 55 which, for the sake of convenience in the present apparatus, is made a part of an arcuately segmental shutter generally designated 56. Where the tape or film progressing mechanism is used in an apparatus other than a motion picture camera or projector which for well-known reasons require a shutter, the cam 55 is made as an independent element or made unitary with cam 53. The cam 55 has a cam surface which varies axially both ways from a plane perpendicular to the axis of the shaft 16 and has level high and low portions. Thus, at 55a the cam has a maximum thickness (high surface) and is connected by smooth slopes 55c and 55d to portion 55b which has a minimum thickness (low surface). The slope between the maximum and minimum is illustrated in Figure 15, which also illustrates the shape of cam 53 which likewise has high and low surfaces.

Upon the frame 22 there is mounted a wire spring 61 of generally U shape having ends 62 inserted through holes in the main frame 10. The spring 61 is shaped so as to be hooked around headed posts 64—64 on the top and bottom members 24 and 25 of the frame 22 and then extends as illustrated in Figures 3 and 5, to a position such that it bears against side arms 35 and 36 of the frame 30. The frame 30 is provided with a cam rider 66 positioned so as to ride upon the shaped cam surface of cam 55 and thus, as the shaft 16 turns, cam 55 causes the entire frame 30 to be oscillated back and forth, as indicated by the double arrow 68, Figures 5 and 6. Since the frame 30 carries the parallel arms 39 and 40 with it and the arms carry claws 46 and 48, this oscillatory motion causes the claws 46 and 48 to be brought into and out of a position to engage the tape or film perforations. Thus, in Figure 5 when the cam rider 66 is in engagement with the high portion 55a of cam 55, the frame 30 is swung against the action of spring 61 to a position such that the claws 46 and 48 on the arms 39 and 40 are moved away from the film 20, whereas in Figure 6 when the cam rider 66 is upon the low portion 55b of the cam 55, the frame 30 is swung due to the action of spring 61 to a position such that the arms 39 and 40 are moved toward the film 20 and hence to a position such that the claws 46 and 48 are in a position to engage perforations in the tape or film 20.

The sloping portions 53c (and also 53d) of cam 53 Figure 15, are shaped so as to provide a constant acceleration of the arms 39 and 40, claws 46 and 48 and hence of film 20 for the portion of the movement from one frame to a position halfway between frames and then a constant deceleration from the half-way point to the position of the next frame. In this way, the film progressing mechanism produces a uniform accelerative pull upon the film until its maximum speed is reached and the film is then slowed down at a uniform rate. The film is thus subjected to the least possible force coresistant with the necessity for movement.

It may also be noted that this shape of cam 53 is such that the points of contact of the circularly curved cam riders 51 and 52 with the cam is constant throughout the movement from one extreme position Figure 11, through the positions represented by Figures 12 and 13 to the position shown in Figure 14. Both cam riders 51 and 52 are thus always in contact with cam 53.

The distance of vertical movement of the claws 46 and 48 under influence of cam 53 is equal to the center to center distance between film perforations plus a slight distance for clearance, in order that the leading claw upon entering the film, may do so without scraping the edge of the perforation. The trailing claw normally enters about the middle of the perforation.

Cam 55 is on the same shaft, shaft 16, as cam 53 and the two cams are either made integral or pinned together as illustrated at 69, Figure 2. The cams are oriented with reference to each other as illustrated in Figure 15. Cam 53 has a high portion 53a extending from about 350 degrees in the cycle to about 100 degrees, and is connected by a smoothly sloping portion 53c, (curved to produce constant acceleration and deceleration) to the low portion 53b which extends from about 170 degrees to about 280 degrees. From the low portion there extends the upwardly sloping portion 53d of the cam. Figure 15 also illustrates cam 55. From 0 degrees to 90 degrees cam 55 slopes from the high to the low portions. From 90 degrees to 180 degrees the cam 55 remains low. From 180 degrees to 270 degrees cam 55 increases in thickness from low to high and remains high from 270 degrees to 360 degrees.

Cam 55, it will be remembered, controls the horizontal motion, whereas cam 53 controls the vertical motion. For convenience legends have been added to Figure 15 showing the type of claw movement occasioned by the cams 53 and 55. There are also shown in Figure 15 shaded sections indicating the effect of shutter vanes I, II and III, and also legends indicating the instantaneous positions corresponding to Figures 11, 12, 13 and 14. In Figures 11–14 there is included a vector Z and in addition two film frames A and B are shown. The frame in the projecting position is shown in heavy lines, whereas the frame in the light lines is either above or below projecting position as the case may be.

In Figure 11 which corresponds to 0 degrees on Figure 15, the cam 55 is just beginning the movement of the claws into engagement with the film, the claws at such instance being in the upper position, as determined by cam 53. At this instance also shutter vane I is interposed in the path of projected light and therefore frame A, although in a position to be shown, is not undergoing projection. As the shaft 16 rotates the trailing edge of shutter vane I passes out of alignment with frame A (projecting position), and from about 45 degrees to about 100 degrees (see Figure 15), light is projected through film frame A and this frame is accordingly projected on the screen. During this period cam 53 remains elevated due to its high portion 53a, this condition continuing to about 100 degrees. The horizontal motion of the claw into engagement with the film under influence of cam 55, is in the meantime completed at 90 degrees.

Figure 12 indicates the condition of the parts at 90 degrees. Frame A which has been undergoing projection is just about to be covered by the leading edge of shutter vane II, this being timed so as to occur at about 100 degrees more or less. Cam 55 has moved the claws into engagement with the film perforations and the cam portion 53c of the cam 53 is about to begin the downward motion of the parallel arms 39 and 40 so as to progress the film downwardly. Thus, at about 100 degrees the shutter vane II intercepts the light path through frame A and simultaneously cam 53 causes the film to be progressed downwardly with uniform acceleration to maximum speed and then with uniform deceleration until stopped. The progressing motion is continued to about 170 degrees at the beginning of the low sector 53b of the cam 53.

Figure 13 indicates the condition of the parts at about 180 degrees. Shutter vane II which prevented projection during the film movement, has just passed the position of projected light and from about 170 degrees to about 230 degrees as determined by the trailing edge of shutter II and the leading edge of shutter III, frame B undergoes projection. During this period (from about 170 degrees to 280 degrees) cam 53 maintains the claws in the lower position, and during a portion of this period (from 180 degrees to 270 degrees) cam 55 causes the horizontal withdrawal of the claws from engagement with the film. The shutter vane III intercepts the light passing through film frame B at about 230 degrees and continues until 270 degrees. It may be explained at this juncture that where the apparatus is used in motion picture projectors the only limitations upon the shutter vane dimensions are those embodied upon shutter vane II which intercepts the passage of light through the film during the time the film is being progressed. The dimensions of shutter vanes I and III may be varied considerably and one or two such shutter vanes may be used, as desired, the only requirement being to obtain a light chopping effect during the remaining portion of the cycle.

Figure 14 illustrates the condition of parts at 270 degrees. In this position the shutter vane III is about to complete its interception of the light passing through film frame B. The claws have been withdrawn from the film through action of cam 55 and the parallel arms 39—40 and the claws are about to be moved back to starting position, due to the action of cam 53. At about 280 degrees the shutter III passes out of alignment with frame B which consequently undergoes projection to about 350 degrees. During this same period from 270 degrees to 350 degrees, though not necessarily for this exact period, cam segment 53d moves the parallel arms 39—40 and the claws carried by them back to starting position. Since frame B will not be moved until the interval of 100–170 degrees of the succeeding cycle, it is again projected as indicated for frame A of Figure 15 and thus each frame is projected for three approximately equally spaced intervals during the cycle.

The link 42 illustrated in Figure 7 may be replaced if desired by the link shown in Figure 9 which is preferably fashioned of a single piece of metal 70 shaped as shown. The horizontal portions 70a and 70b are provided with ears 70c which are pivotally mounted by means of rivets 44 and 45 upon the parallel arms 39 and 40 after the manner shown in Figure 7. The right angular configuration of the main body of link 70 and ends 70a and 70b may be utilized to produce a slight pressure of cam followers 51 and 52 of the arms 39 and 40 respectively upon the surface of cam 53. The distance across the cam 53 measured from cam follower 51 and 52 is, within manufacturing tolerances, constant throughout the varying positions of the cam 53 with reference to the cam followers. However, any slight variation in distance can be absorbed by the resiliency of link 70, illustrated in Figure 9, wherein the portions 70a and 70b constitute flexible sidearms in respect to the body of the link.

A slightly modified form of link is illustrated in Figure 10 wherein the link is composed of a resilient strip 71 which is riveted or brazed to the bent over ends 39a and 40a of the arms 39 and 40 respectively. To the resilient strip 70 there is riveted or otherwise attached a claw frame 72 having claws 72a and 72b thereon.

In Figure 8 there is illustrated another modified form of the invention utilizing a single arm 72 which is provided with a bent over tab forming a claw at 76. The arm 75 is drawn downwardly so as to bring its cam follower 78 into engagement with the cam 53 by means of a light tension spring 79 which is attached to an apertured protuberance 80 on the frame 30. The form of progressing mechanism shown in Figure 8 is perfectly satisfactory except for worn film in which the perforations may be torn out, in which event the film is not progressed when the torn place is reached by the claw 76. Under such circumstances the machine must be stopped and the film progressed by hand until a sound portion of the film is again reached whereupon operation may be resumed.

In apparatus of the type shown in Figures 1–7 and 9–14 badly worn film having many perforations torn out may be progressed with regularity. As many as four perforations may be torn out without causing any interruption in the smooth feeding of the film for when the leading claw (leading in the direction of film progressing movement) reaches a portion of the film where the perforations are torn out, the trailing claw which ordinarily merely enters but does not contact the edge of the film perforation then moves into contact with the edge of the perforation in which it is located and pushes the film through for as many frames as there may be where perforations are torn.

In the apparatus herein illustrated, the cam followers 51 and 52 are located in line vertically with the axis of shaft 16 carrying cam 53. The pivot pins 26a and 28a, serving to support the swing frame 30, are likewise located in line vertically above and below the shaft 16. Consequently, as the swing frame 30 pivots on pins 26a and 28a, the cam riders 51 and 52 are maintained in substantially constant relationship with respect to the cam 53 upon which they operate. The oscillatory movement of the swing frame about pivot pins 26a and 28a causes a slight angular misalignment of the cam followers 51 and 52 upon the cam 53, but this is negligible.

The location of the cam followers 51 and 52 and cam 53 between the pivots 35 and 36 and the claws 46 and 48 of the lever arms 39 and 40, has the effect of multiplying the small movement imposed by the cam 53. Consequently the cam 53 may be made very small as compared to other mechanisms heretofore available and this permits a design wherein there is a high ratio of the length of time available for projecting the film to the length of time consumed by film movement. In the apparatus illustrated, there is no idling or false stroke, and due to the multiplying effect of levers 39 and 40 on the motion of cam 53, the inertia factors are low, since the cam followers 51 and 52 are moved only a short distance as compared to the degree of movement of the claw and of the lever arms 39 and 40.

Where the apparatus is used for motion picture cameras, the shutter 56 is modified to suit the conditions therein and where the apparatus is utilized for other tape progressing motions, it is modified to suit the installation.

As many apparently widely different embodiments of this invention may be made without departing from the spirit and scope thereof, it is to be understood that I do not limit myself to the specific embodiments herein except as defined by the appended claims.

What I claim is:

1. An apparatus for moving an indicia carrying uniformly perforated tape endwise by a periodic step-by-step motion comprising a guideway for maintaining said tape approximately straight throughout a portion of its path of movement, a shaft rotatably mounted and positioned alongside the guideway and perpendicular to the plane thereof, a generally rectangular open-centered frame circumscribing the shaft, pivotal mounting means for said frame, the axis of said pivotal mounting being approximately parallel to the tape in said guideway with the axis thereof intersecting said shaft, a pair of levers pivotally mounted on the frame on the side opposite the guideways, said levers being approximately parallel to the frame and tape and positioned transversely with reference to the tape one above and the other below the shaft, a link connecting the levers together at a point overlying the tape, said link having a claw thereon positioned in alignment with the perforations of the tape and compound cam means on said shaft located generally in the open center of the frame, said cam having a cam surface coacting with the levers for moving them about their pivotal mountings on the frame and another cam surface for moving the frame upon its pivotal mounting means all in timed relation for guiding said tip into registry with a tape perforation, then longitudinally of the tape axis for movement of the tape longitudinally, then out of registry with said tape and thence back to starting position while out of registry with said tape.

2. An apparatus for moving an indicia carrying uniformly perforated tape endwise by a periodic step-by-step motion comprising a guideway for maintaining said tape approximately straight throughout a portion of its path of movement, a shaft rotatably mounted and positioned alongside the guideway and perpendicular to the plane thereof, a generally rectangular open-centered frame circumscribing the shaft, pivotal mounting means for said frame, the axis of said pivotal mounting being approximately parallel to the tape in said guideway with the axis thereof intersecting said shaft, a pair of lever arms pivotally mounted on the frame, said pivotal mounting being on the side opposite said guideway, said levers being approximately parallel to the frame and tape and positioned transversely with reference to the tape one above and one below the shaft, a link connecting the levers together at a position adjacent the tape, said link having claw means thereon extending transverse to the plane of the levers, and positioned in alignment with the perforations of the tape, and a compound cam mounted on the shaft to rotate therewith having a first cam surface positioned between the levers and engageable with lever arm cam-followers mounted on the levers for oscillating the levers on their pivots, said compound cam having a second cam surface movable adjacent the frame and engageable with a frame cam-follower on the frame for oscillating the frame on its pivotal mounting means, said cams being shaped and oriented with reference to each other so that the claw is moved transversely of the tape into registry with a perforation therein, then while in registry, longitudinally of the tape axis to thus move the tape, then transversely of the tape out of registry therewith and thence, while out of registry, longitudinally of the tape to the starting position.

3. The apparatus of claim 2 further characterized in that the link is pivotally connected at each of its ends to the lever arms.

4. The apparatus of claim 2 further characterized in that the link is provided with a pair of claws having tape engaging surfaces spaced apart a slightly greater distance than the center-to-center distance than two selected perforations of the tape.

5. The apparatus of claim 2 further characterized in that the frame is of light weight metal.

6. The apparatus of claim 2 further characterized in that the first cam surface is an eccentric of uniform transaxial dimension and the lever arm cam-followers are spaced apart diametrically a distance just slightly greater than said dimension.

7. The apparatus of claim 2 further characterized in that the frame is spring biased to cause the frame cam-follower to ride continuously in contact with the second cam-surface.

8. The apparatus of claim 2 further characterized in that the frame is anodized aluminum alloy.

9. The apparatus of claim 2 further characterized in that the lever arm cam followers are approximately in alignment with the axis of the frame pivotal mounting.

10. The apparatus of claim 2 further characterized in that the link is slightly elastic so as to cause the lever arm cam followers to ride under slight pressure upon the cam.

11. The apparatus of claim 2 further characterized in that the tape is a motion picture projection film and a segmental arcuate light shutter and compound cam are mounted on a single operating shaft.

ROY A. CLAPP.